(12) United States Patent
Bruno et al.

(10) Patent No.: US 8,271,588 B1
(45) Date of Patent: Sep. 18, 2012

(54) SYSTEM AND METHOD FOR FILTERING FRAUDULENT EMAIL MESSAGES

(75) Inventors: Mark Bruno, San Francisco, CA (US);
David Cowings, El Cerrito, CA (US);
Sanford Jensen, Berkeley, CA (US);
Dylan Morss, San Francisco, CA (US);
Ken Schneider, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 1304 days.

(21) Appl. No.: 10/949,465

(22) Filed: Sep. 24, 2004

Related U.S. Application Data

(60) Provisional application No. 60/506,372, filed on Sep. 24, 2003.

(51) Int. Cl.
*G06F 15/16* (2006.01)

(52) U.S. Cl. ............ 709/206; 726/6; 726/26; 705/70; 705/42; 705/318

(58) Field of Classification Search ............ 709/206, 709/219, 202–203, 223–229, 231–232, 200; 726/3–6, 17–19, 21–30; 707/50; 705/42–44, 705/304–305, 317–318
See application file for complete search history.

(56) References Cited

U.S. PATENT DOCUMENTS

| | | | |
|---|---|---|---|
| 5,121,345 A | 6/1992 | Lentz | |
| 5,377,354 A | 12/1994 | Scannell et al. | |
| 5,440,723 A | 8/1995 | Arnold et al. | |
| 5,537,540 A | 7/1996 | Miller et al. | |
| 5,619,648 A | 4/1997 | Canale et al. | |
| 5,675,507 A | 10/1997 | Bobo, II | |
| 5,790,789 A | 8/1998 | Suarez | |
| 5,796,948 A | 8/1998 | Cohen | |
| 5,802,277 A | 9/1998 | Cowlard | |
| 5,822,527 A | 10/1998 | Post | |
| 5,826,022 A | 10/1998 | Nielsen | |
| 5,835,087 A | 11/1998 | Herz | |
| 5,862,325 A | 1/1999 | Reed et al. | |
| 5,870,546 A | 2/1999 | Kirsch | |
| 5,884,033 A | 3/1999 | Duvall et al. | |
| 5,919,257 A | 7/1999 | Trostle | |
| 5,930,479 A | 7/1999 | Hall | |

(Continued)

FOREIGN PATENT DOCUMENTS

EP  0375138  6/1990

(Continued)

OTHER PUBLICATIONS

U.S. Appl. No. 10/117,065, entitled "Apparatus and Method for Weighted and Aging Spam Filtering Rules", by Aronson, et al., filed Apr. 4, 2002.

(Continued)

*Primary Examiner* — Greg C Bengzon
(74) *Attorney, Agent, or Firm* — Meyertons, Hood, Kivlin, Kowert & Goetzel, P.C.; Dean M. Munyon; Paul T. Seegers

(57) ABSTRACT

Systems and methods for filtering fraudulent email messages are described. In one embodiment, a method includes receiving an email message, determining whether the email message is indicative of fraud, and creating a fraud filter based on the email message if the email message is fraudulent.

16 Claims, 7 Drawing Sheets

U.S. PATENT DOCUMENTS

| | | | |
|---|---|---|---|
| 5,956,481 A | 9/1999 | Walsh et al. | |
| 5,999,932 A | 12/1999 | Paul | |
| 6,023,700 A | 2/2000 | Owens et al. | |
| 6,023,723 A | 2/2000 | McCormick et al. | |
| 6,052,709 A | 4/2000 | Paul | |
| 6,073,165 A | 6/2000 | Narasimhan et al. | |
| 6,088,804 A | 7/2000 | Hill et al. | |
| 6,112,227 A | 8/2000 | Heiner | |
| 6,146,026 A | 11/2000 | Ushiku | |
| 6,157,630 A | 12/2000 | Adler et al. | |
| 6,161,130 A | 12/2000 | Horvitz et al. | |
| 6,182,118 B1 | 1/2001 | Finney et al. | |
| 6,182,227 B1 | 1/2001 | Blair et al. | |
| 6,189,026 B1 | 2/2001 | Birrell et al. | |
| 6,195,686 B1 | 2/2001 | Moon et al. | |
| 6,199,102 B1 | 3/2001 | Cobb | |
| 6,216,165 B1 | 4/2001 | Woltz et al. | |
| 6,226,630 B1 | 5/2001 | Billmers | |
| 6,230,156 B1 | 5/2001 | Hussey | |
| 6,266,774 B1 | 7/2001 | Sampath et al. | |
| 6,272,641 B1 | 8/2001 | Ji | |
| 6,314,454 B1 | 11/2001 | Wang et al. | |
| 6,321,267 B1* | 11/2001 | Donaldson | 709/229 |
| 6,327,610 B2 | 12/2001 | Uchida et al. | |
| 6,330,588 B1 | 12/2001 | Freeman | |
| 6,334,140 B1 | 12/2001 | Kawamata | |
| 6,360,254 B1* | 3/2002 | Linden et al. | 709/219 |
| 6,393,568 B1 | 5/2002 | Ranger et al. | |
| 6,421,709 B1 | 7/2002 | McCormick et al. | |
| 6,438,125 B1 | 8/2002 | Brothers | |
| 6,466,966 B1 | 10/2002 | Kirsch et al. | |
| 6,505,237 B2 | 1/2003 | Beyda et al. | |
| 6,523,120 B1 | 2/2003 | Strasnick | |
| 6,654,787 B1 | 11/2003 | Aronson et al. | |
| 6,671,812 B1 | 12/2003 | Balasubramaniam et al. | |
| 6,742,127 B2* | 5/2004 | Fox et al. | 726/10 |
| 6,785,732 B1 | 8/2004 | Bates et al. | |
| 6,792,543 B2 | 9/2004 | Pak et al. | |
| 6,836,272 B2 | 12/2004 | Leung et al. | |
| 6,859,833 B2 | 2/2005 | Kirsch et al. | |
| 6,880,087 B1* | 4/2005 | Carter | 726/23 |
| 7,010,698 B2 | 3/2006 | Sheymov | |
| 7,072,944 B2 | 7/2006 | Lalonde et al. | |
| 7,096,500 B2 | 8/2006 | Roberts et al. | |
| 7,100,049 B2* | 8/2006 | Gasparini et al. | 713/170 |
| 7,114,177 B2* | 9/2006 | Rosenberg et al. | 726/4 |
| 7,117,533 B1* | 10/2006 | Libenzi | 726/24 |
| 7,150,044 B2* | 12/2006 | Hoefelmeyer et al. | 726/23 |
| 7,219,131 B2* | 5/2007 | Banister et al. | 709/206 |
| 7,272,853 B2* | 9/2007 | Goodman et al. | 726/13 |
| 7,331,062 B2 | 2/2008 | Alagna et al. | |
| 7,475,425 B2* | 1/2009 | Bantz et al. | 726/22 |
| 7,540,021 B2* | 5/2009 | Page | 726/6 |
| 2002/0007301 A1 | 1/2002 | Reuning | |
| 2002/0046065 A1 | 4/2002 | Nighan et al. | |
| 2002/0147780 A1 | 10/2002 | Liu et al. | |
| 2002/0150243 A1 | 10/2002 | Craft et al. | |
| 2002/0174137 A1 | 11/2002 | Wolff et al. | |
| 2003/0009529 A1* | 1/2003 | Powers | 709/206 |
| 2003/0159070 A1 | 8/2003 | Mayer et al. | |
| 2004/0054917 A1 | 3/2004 | Obrecht et al. | |
| 2004/0064736 A1 | 4/2004 | Obrecht et al. | |
| 2004/0078422 A1 | 4/2004 | Toomey | |
| 2004/0123157 A1 | 6/2004 | Alagna et al. | |
| 2004/0177120 A1* | 9/2004 | Kirsch | 709/206 |
| 2004/0187023 A1 | 9/2004 | Alagna et al. | |
| 2004/0230820 A1 | 11/2004 | Hui Hsu et al. | |
| 2005/0050222 A1* | 3/2005 | Packer | 709/238 |
| 2005/0076222 A1* | 4/2005 | Olkin et al. | 713/176 |
| 2005/0081059 A1* | 4/2005 | Bandini et al. | 713/201 |
| 2005/0097320 A1* | 5/2005 | Golan et al. | 713/166 |
| 2005/0108339 A1 | 5/2005 | Gleeson et al. | |
| 2005/0108340 A1 | 5/2005 | Gleeson et al. | |
| 2005/0132070 A1* | 6/2005 | Redlich et al. | 709/228 |
| 2005/0137980 A1 | 6/2005 | Bullock et al. | |
| 2006/0021031 A1* | 1/2006 | Leahy et al. | 726/22 |
| 2006/0031298 A1* | 2/2006 | Hasegawa | 709/206 |
| 2006/0053490 A1* | 3/2006 | Herz et al. | 726/23 |
| 2006/0168006 A1* | 7/2006 | Shannon et al. | 709/206 |
| 2006/0251068 A1* | 11/2006 | Judge et al. | 370/389 |
| 2006/0288076 A1 | 12/2006 | Cowings et al. | |
| 2007/0101423 A1* | 5/2007 | Oliver et al. | 726/22 |
| 2007/0107053 A1* | 5/2007 | Shraim et al. | 726/22 |
| 2007/0143432 A1* | 6/2007 | Klos et al. | 709/206 |
| 2007/0150743 A1* | 6/2007 | Weatherford et al. | 713/184 |
| 2008/0028465 A1* | 1/2008 | Bantz et al. | 726/22 |
| 2008/0046334 A1* | 2/2008 | Lee et al. | 705/26 |
| 2008/0189254 A1* | 8/2008 | Cancel et al. | 707/3 |
| 2010/0169970 A1* | 7/2010 | Stolfo et al. | 726/22 |
| 2011/0296531 A1* | 12/2011 | Toomey | 726/26 |

FOREIGN PATENT DOCUMENTS

| | | |
|---|---|---|
| EP | 0420779 | 4/1991 |
| EP | 0720333 | 7/1996 |
| GB | 2271002 | 3/1994 |
| WO | 9635994 | 11/1996 |
| WO | 0203178 | 1/2002 |
| WO | 02103533 | 12/2002 |
| WO | 2004021197 | 3/2004 |
| WO | 2004055632 | 7/2004 |
| WO | 2004072777 | 8/2004 |

OTHER PUBLICATIONS

U.S. Appl. No. 10/871,583, entitled "System and method for filtering spam messages utilizing URL filtering module", by Cowings, et al., filed Jun. 17, 2004.

U.S. Appl. No. 11/116,572, entitled "Method and apparatus for creating aggressive anti-spam rules", by Chin, et al., filed Apr. 27, 2005.

U.S. Appl. No. 11/127,814, entitled "Method and apparatus for detecting spam in email messages and email attachments", by Cowings, filed May 11, 2005.

U.S. Appl. No. 11/157,327, entitled "Method and apparatus for grouping spam email messages", by Jensen, filed Jun. 20, 2005.

U.S. Appl. No. 11/048,958, entitled "Method and apparatus for determining the source of an email message", by Mantel, filed Feb. 1, 2005.

U.S. Appl. No. 11/127,813, entitled "Method and apparatus for simulating end user responses to spam email messages", by Khalsa, et al., filed May 11, 2005.

Gaskin, J.E., "Don't get spammed", Information Week, Aug. 18, 1997, retrieved from Internet: http://www.informationweek.com/644/44olspm.htm, 9 pages.

Ranum, et al; "Implementing a generalized tool for network monitoring"; Proceedings of the 11th Systems Administration Conference; San Diego, CA; Oct. 26-31, 1997; pp. 1-8.

\* cited by examiner

SYSTEM AND METHOD FOR FILTERING FRAUDULENT EMAIL MESSAGES

RELATED APPLICATION

The present application claims priority to U.S. Provisional Application Ser. No. 60/506,372, filed Sep. 24, 2003, which is incorporated herein in its entirety.

FIELD OF THE INVENTION

The present invention relates to data processing, and in particular, to filtering fraudulent email messages.

BACKGROUND OF THE INVENTION

Recent studies indicate a steady increase of fraudulent email spam. One of the most troubling Internet fraud schemes is phishing. Phishing, short for password harvesting fishing, is the luring of sensitive information, such as password and other personal information, from a victim by masquerading as someone trustworthy with a real need for such information. It is a form of social engineering attack. Popular targets are users of online banking service, and auction sites such as eBay®. Phishers usually work by sending out spam email to a large number of potential victims. These emails direct the recipients to a web page, which appears to belong to their online bank, for example, but in fact captures their account information for the phisher's use. Typically the email will appear to come from a trustworthy company and contain a subject and message intended to alarm the recipients into taking action. A common approach is to tell the recipients that their account has been de-activated due to a problem and inform them that they must take action to re-activate their account. The recipients are provided with a convenient link in the same email that takes them to a fake web page appearing to be that of a trustworthy company. Once at that page, the recipients enter their personal information, which is then captured by the fraudster.

When the recipients realize that they are victims of a scam, they complain directly to the company that has been spoofed. The defrauded company is then flooded with thousands of angry complaints, severely straining their IT resources, as well as damaging their brand value and customer relationships.

SUMMARY OF THE INVENTION

Systems and methods for filtering fraudulent email messages are described herein. In one embodiment, a method includes receiving an email message, determining whether the email message is indicative of fraud, and creating a fraud filter based on the email message if the email message is fraudulent.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Figure 1:
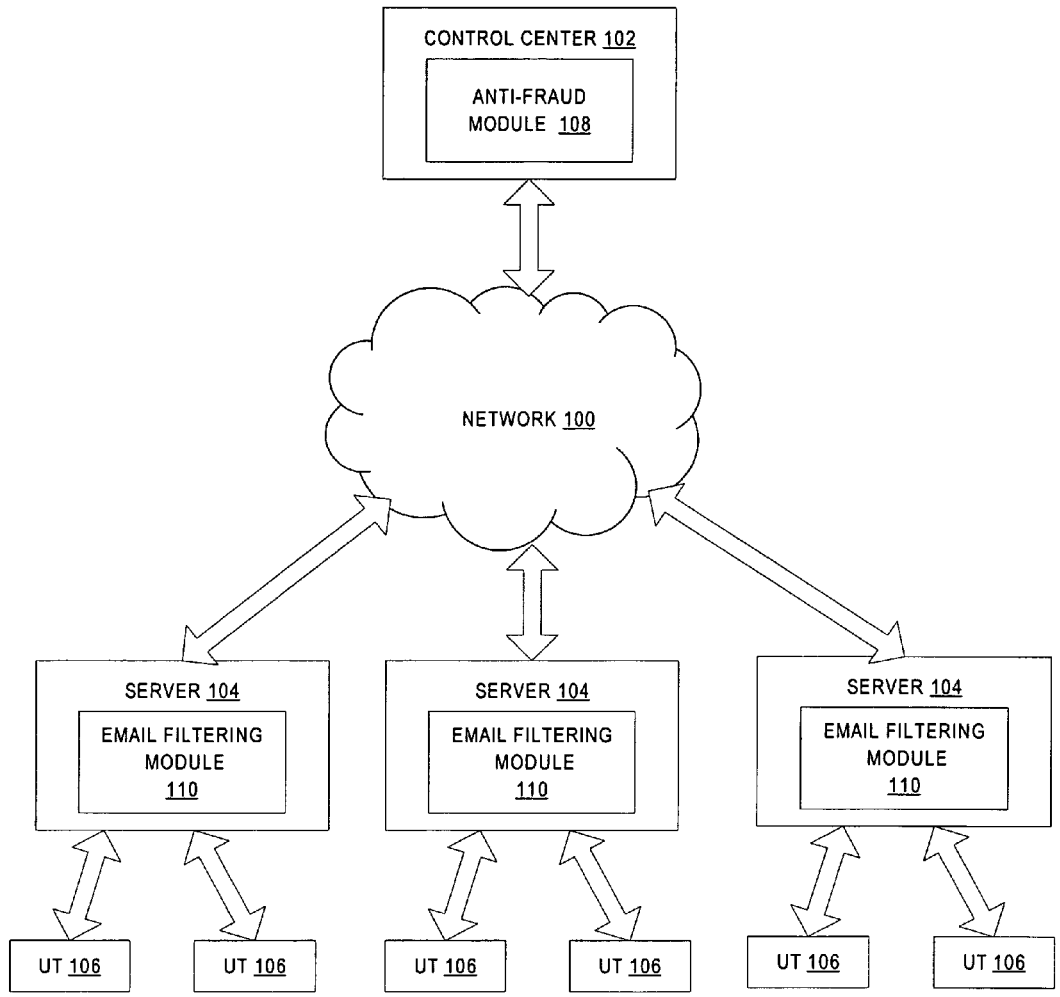
FIG. 1 is a block diagram of one embodiment of a system for controlling delivery of fraudulent electronic mail.

Methods and systems for filtering fraudulent email messages are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of one embodiment of a system for controlling delivery of fraudulent electronic mail (email). The system includes a control center 102 coupled to a communications network 100 such as a public network (e.g., the Internet, a wireless network, etc.) or a private network (e.g., LAN, Intranet, etc.). The control center 102 communicates with multiple network servers 104 via the network 100. Each server 104 communicates with user terminals 106 using a private or public network.

The control center 102 is an anti-fraud facility that is responsible for detecting fraud attacks that utilize brands of subscribers of the control center 102 (and/or non-subscribers in some embodiments), developing filters for protecting end users from fraud, and distributing the filters to servers 104.

A server 104 operates at a customer site and may be a mail server that receives and stores messages addressed to end users of corresponding user terminals 106. Alternatively, a server 104 may be a different server coupled to the mail server 104. Servers 104 are responsible for filtering incoming messages based on the fraud filters received from the control center 102. Servers 104 operate as clients receiving services from the control center 102.

In one embodiment, the control center 102 includes an anti-fraud module 108 that is responsible for evaluating email messages, determining which of the incoming messages are fraudulent, creating fraud filters based on the fraudulent email messages, and distributing the fraud filters to the servers 104. In one embodiment, the email messages evaluated by the anti-fraud module 108 are email messages received at numerous probe e-mail addresses (e.g., decoy email accounts and expired domains) specifically selected to insure their inclusion into as many mailing lists as possible.

Each server 104 includes an email filtering module 110 that is responsible for storing fraud filters received from the control center 102, detecting incoming email messages that are fraudulent, and blocking the fraudulent email messages for the users of user terminals 106.

Figure 2:
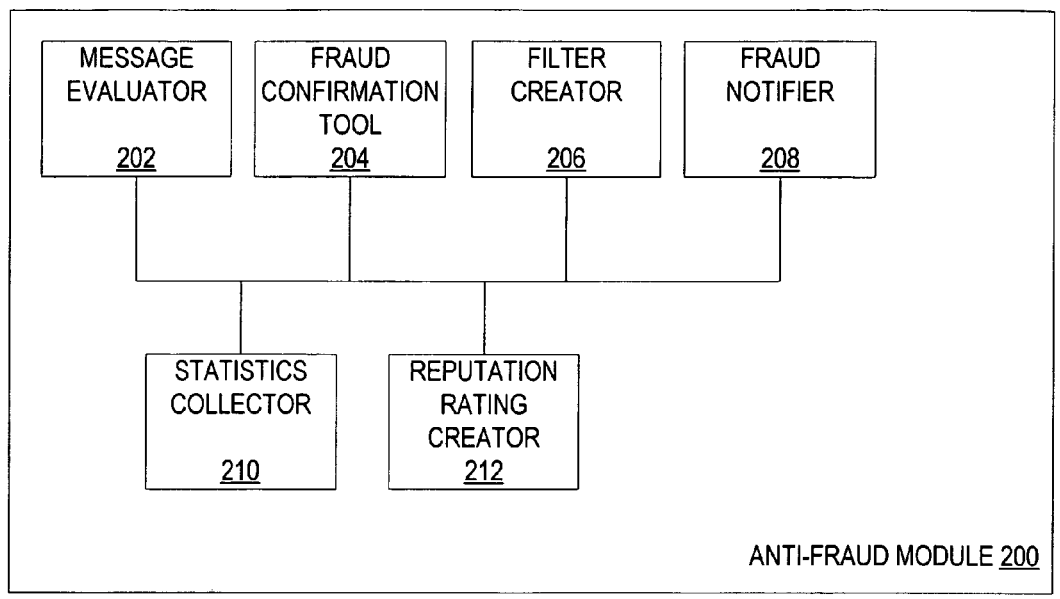
FIG. 2 is a block diagram of one embodiment of an anti-fraud module.

FIG. 2 is a block diagram of one embodiment of an anti-fraud module 200. The anti-fraud module 200 may include a message evaluator 202, a fraud confirmation tool 204, a filter creator 206, a fraud notifier 208, a statistics collector 210, and a reputation rating creator 212.

The message evaluator 202 is responsible for receiving email messages sent to probe email accounts and determining whether these email messages are likely to be fraudulent. In one embodiment, the message evaluator 202 determines whether an email message is likely to be fraudulent using heuristic analysis. The heuristic analysis may be defined based on information provided by subscribers of anti-fraud services. For example, a subscriber may specify email characteristics that may be present in their email messages and email characteristics that are never present in their email messages. In an alternative embodiment, the heuristic analysis may be common to all subscribers. For example, the heuristic analysis may be checking for the presence of a predefined combination of email characteristics in the message (e.g., the phrase "re-activate your account" and a URL in the body of the message that differs from the host name of the sender's email address).

In one embodiment, if the message evaluator 202 determines that the email message is likely to be fraudulent, it sets an alert for this email message.

The fraud confirmation tool 204 provides a user interface assisting in further evaluation of email messages (e.g., email messages for which an alert has been set). In one embodiment, the fraud confirmation tool 204 contains a set of screens corresponding to the steps that should be taken by an analyst of the control center 102 when determining whether a suspected fraud message is actually fraudulent. Each screen may highlight a certain message characteristics that may be indicative of fraud. For example, the first screen may highlight the subject line of the message if it includes suspicious text (e.g., "eBay Account—ERROR"). The second screen may highlight the sender data if the host name of the sender's email address does not match signature data provided in the body of the message (e.g., the sender data may be "Judy Williams"<billingdept@elvis.com>, and the signature data may be "Judy Williams, America Online Billing Dept."). The third screen may highlight suspicious URLs in the message, etc.

In another embodiment, the fraud confirmation tool 204 displays a suspected fraud message to a corresponding subscriber and asks the subscriber to confirm that this message is fraudulent. In one embodiment, the fraud confirmation tool 204 removes proprietary information related to probe email accounts prior to displaying the suspected message to the subscriber.

The filter creator 206 is responsible for creating fraud filters and distributing them to customer sites (e.g., servers 104). The fraud filters may include any combination of URL filters, header filters, message body filters, and heuristic filters. A URL filter identifies a fraudulent URL (e.g., includes a hash of a fraudulent URL). A header filter identifies specific characteristics of the header. A message body filter pertains to the body of the message (e.g., includes a hash or some other value derived from the message body). A heuristic filter identifies a predefined combination of message characteristics and a threshold score required for a message to qualify as fraud.

In one embodiment, the filter creator 206 creates fraud filters based on email messages designated as fraud by the fraud confirmation tool 204. In another embodiment, the filter creator 206 creates fraud filters based on email messages designated as potential fraud by the message evaluator 202. In yet another embodiment, the filter creator 206 creates fraud filters based on fraudulent email messages provided by the subscribers or received from the email filtering modules 110. In still another embodiment, the filter creator 206 creates fraud filters based on filtering information (e.g., IP address ranges, a list of valid domain names, etc.) provided by the subscribers. In yet another embodiment, the filter creator 206 creates a combination of some or all of the fraud filters described above.

The fraud notifier 208 is responsible for issuing a notification about the fraudulent (or potentially fraudulent) message. In one embodiment, the notification is sent to a subscriber whose brand is being used in the message to defraud the recipient. Alternatively, an organization whose brand is used to defraud the recipients may not be a subscriber of anti-fraud services. Then, the fraud notifier 208 may sends the notification of the fraudulent message to this organization.

In one embodiment, the notification provides message data that may allow the subscriber to take action against the fraud perpetrator. In one embodiment, the notification indicates that a filter has been created to protect end users from this fraud attack.

The statistics collector 210 is responsible for collecting statistics on fraud detected by the anti-fraud module 200 and fraud detected at the customer sites, and generating reports for subscribers and administrators at customer sites.

The reputation rating creator 212 is responsible for determining reputation ratings of email senders and distributing a current list of reputation ratings to customer sites. The reputation rating may be assigned based on the amount of email messages generated by the sender, the ratio indicating which portion of the generated email messages is spam, fraud, contains viruses, etc. The reputation rating of a sender may decrease or increase depending on the statistics associated with the sender.

Figure 3:
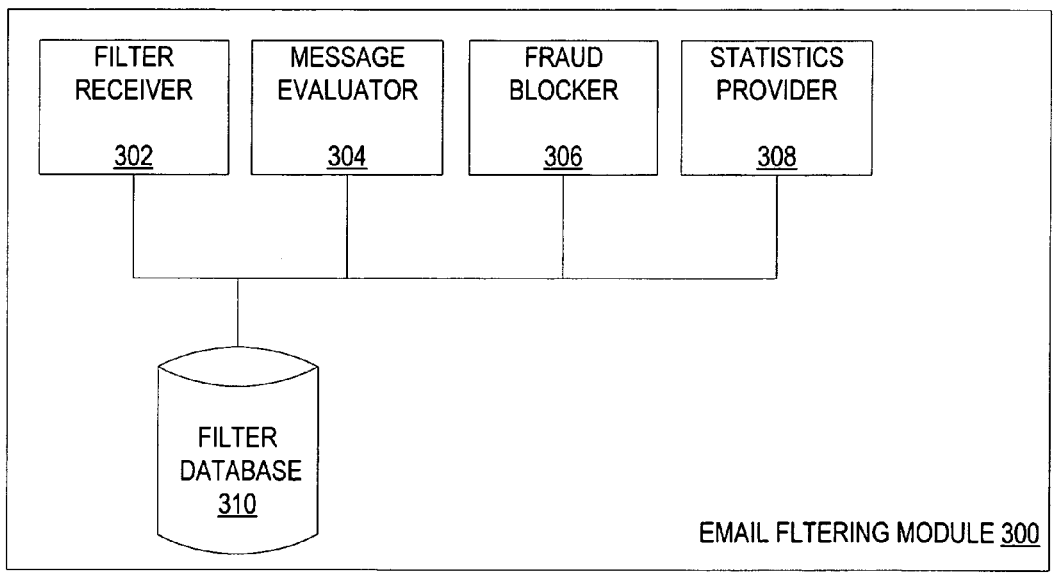
FIG. 3 is a block diagram of a URL filtering module.

FIG. 3 is a block diagram of a URL filtering module 300. The URL filtering module 300 includes a filter receiver 302, a message evaluator 304, a fraud blocker 306, a statistics provider 308, and a filter database 310.

The filter receiver 302 is responsible for periodically receiving current fraud filters from a server (e.g., the control center 102) and storing the fraud filters in the filter database 310. In one embodiment, the filter receiver 302 also receives a current list of reputation ratings and/or a current list of fraudulent websites, and stores this data in the filter database 310.

The message evaluator 304 is responsible for analyzing incoming email messages using the fraud filters and determining whether the incoming email messages are fraudulent. In one embodiment, message evaluator 304 first determines the reputation rating of the message sender. If it is higher than threshold, then the message is forwarded to the recipient. Otherwise, the message is evaluated for fraud.

The fraud blocker 306 is responsible for blocking email messages classified as fraud and forwarding non-fraudulent email messages to intended recipients. In one embodiment, the fraud blocker is also responsible for causing access of end users to fraudulent web sites to be blocked.

The statistics provider 308 is responsible for collecting statistics on incoming email messages and their filtering and sending this statistics to the server.

Figure 4:
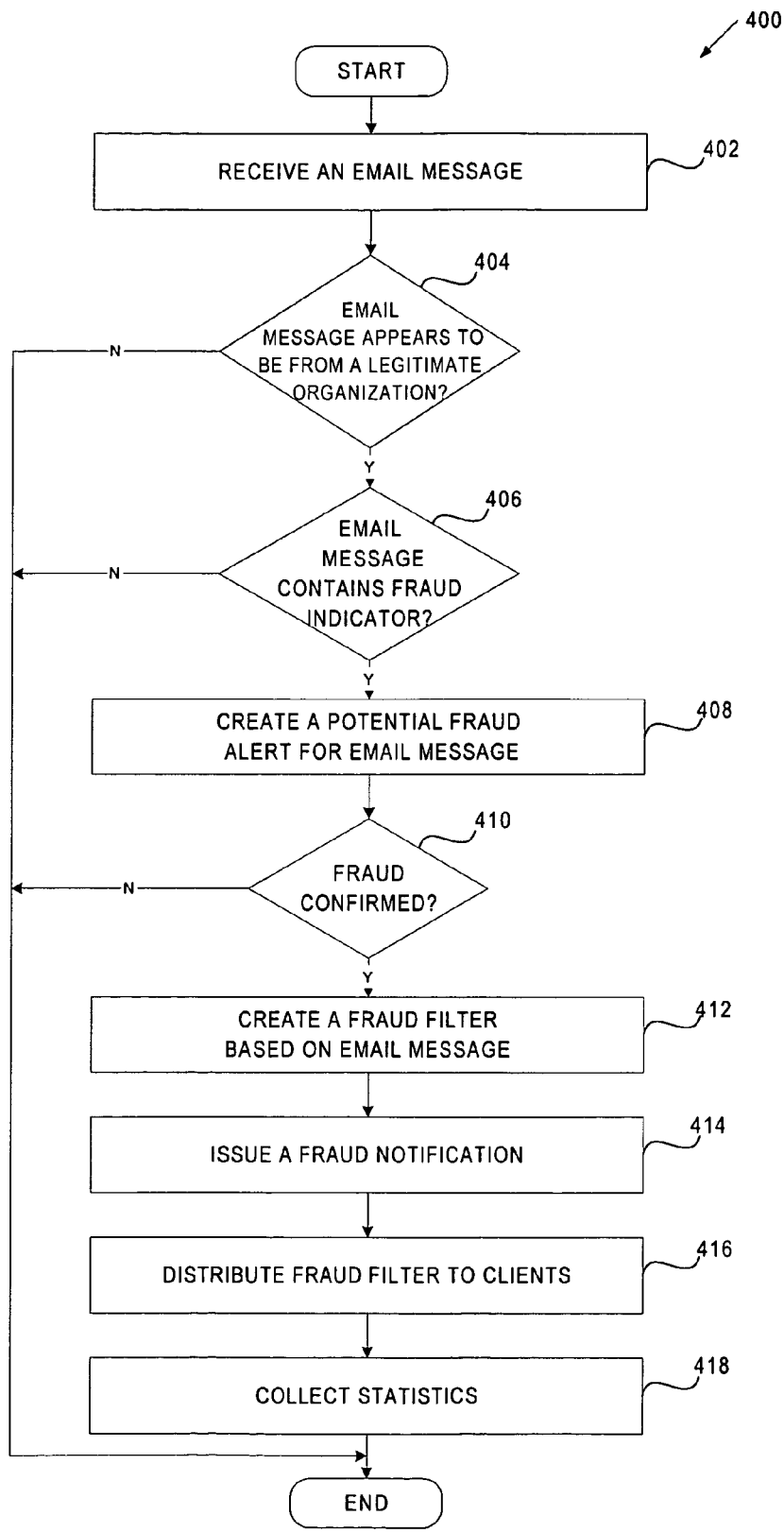
FIG. 4 is a flow diagram of one embodiment of an anti-fraud process.

FIG. 4 is a flow diagram of one embodiment of an anti-fraud process 400. The process may be performed by processing logic that may comprise hardware (e.g., dedicated logic, programmable logic, microcode, etc.), software (such as run on a general purpose computer system or a dedicated machine), or a combination of both. In one embodiment, process 400 is performed by an anti-fraud module 108 of FIG. 1.

Referring to FIG. 4, process 400 begins with processing logic receiving an email message (processing block 402). The email message may be an HTML formatted message, a plain text message, or a message of any other type. In one embodiment, the message is one of the messages sent to probe email accounts.

At processing box 404, processing logic determines whether the email message appears to be from a legitimate organization. In one embodiment, this determination is made using heuristic analysis defined based on data provided by subscribers (e.g., typical characteristics used by each subscriber in their email messages). In another embodiment, this determination is made by searching for predefined common message characteristics indicating that the message was sent by a known organization (e.g., the sender email address may be "billing@gap.com" and the email may be signed as "John Smith, GAP Online Billing Dept.").

If the email message appears to be from a legitimate organization, processing logic further determines whether the email message contains any fraud indicators (processing box 406). In one embodiment, this determination is based on data provided by subscribers (e.g., a list of valid URLs used by the subscriber). In another embodiment, this determination is made by searching for a predefined message characteristic or a combination of message characteristics (e.g., a combination of a keyword and sender data).

If the determination made at processing box 406 is positive, processing logic creates a potential fraud alert for the email message (processing block 404) and determines whether the potential fraud classification of the email message is confirmed (processing box 410). The confirmation may be done by an analyst or a corresponding subscriber.

If the determination made at processing box 410 is positive, processing logic creates a fraud filter based on the email message (processing block 412). The fraud filter may be a URL filter, a header filter, a message body filter, or a heuristic filter.

At processing block 414, processing logic issues a fraud notification. The fraud notification may be sent to a corresponding subscriber or some other entity whose brand was used by the fraud perpetrator to defraud the recipients. The fraud notification may include some message data and indicate that a fraud filter was created for this fraudulent message.

At processing block 416, processing logic distributes the fraud filter to the clients.

At processing block 418, processing logic collects statistics pertaining to fraud detection operations performed locally and at the clients.

Figure 5:
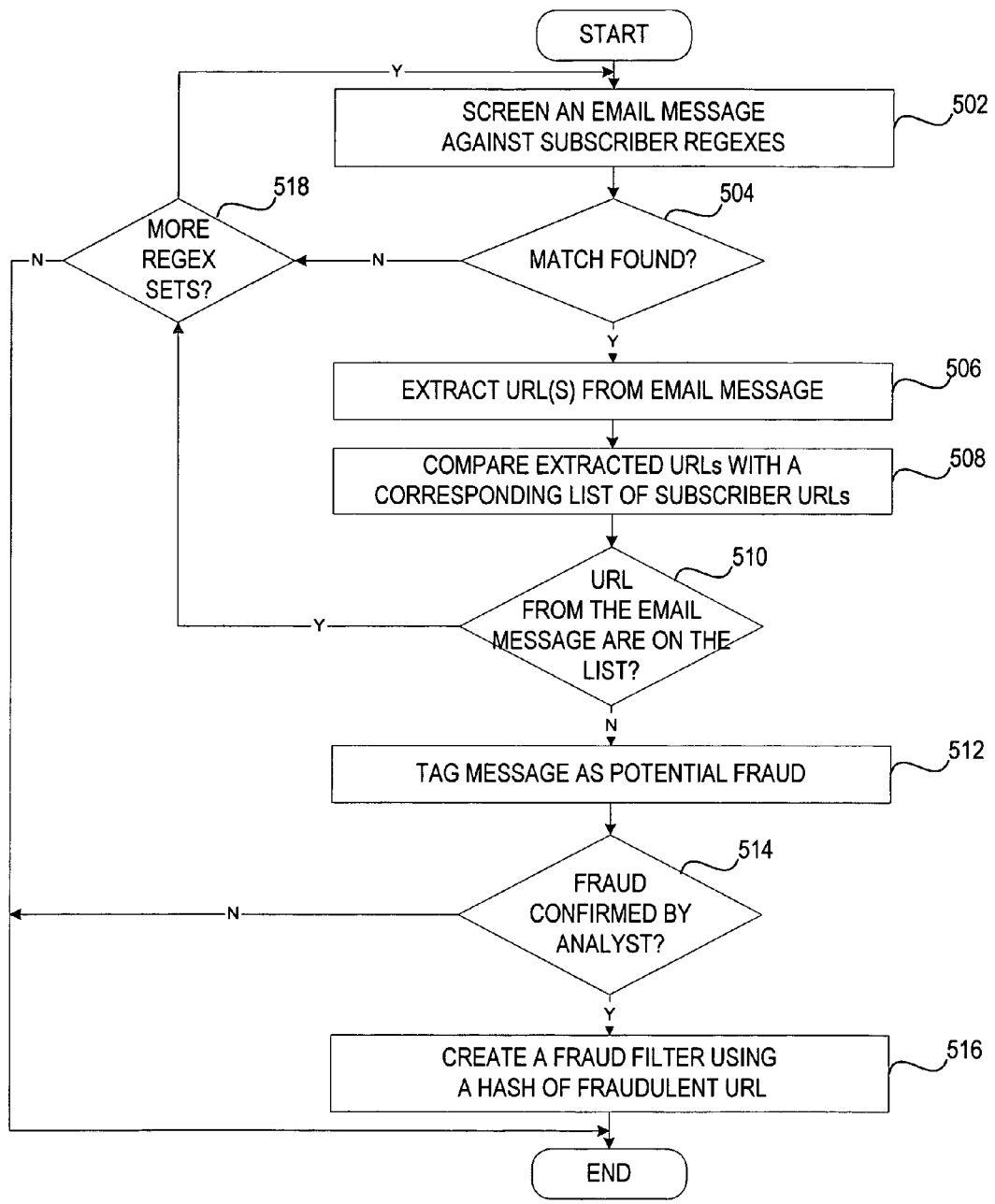
FIG. 5 is a flow diagram of one embodiment of a process for detecting fraud.

FIG. 5 is a flow diagram of one embodiment of a process 500 for detecting fraud. The process may be performed by processing logic that may comprise hardware (e.g., dedicated logic, programmable logic, microcode, etc.), software (such as run on a general purpose computer system or a dedicated machine), or a combination of both. In one embodiment, process 500 is performed by an anti-fraud module 108 of FIG. 1.

Process 500 begins with detecting whether an email message is fraudulent using subscriber-specific heuristics. In one embodiment, the subscriber-specific heuristics may be defined based on two sets of data received from the subscriber: a set of regular expressions (regexes) indicating possible components of the subscriber's messages, and a list of valid URLs used by the subscriber. In particular, at processing block 502, processing logic screens the email message against a first set of regexes. If no match is found, processing logic returns to processing block 502 for the next set of regex if there is any (processing box 518).

Upon finding a match (processing box 504), processing logic extracts the URL(s) from the email message (processing block 506) and compares the extracted URLs with a corresponding list of valid URLs (processing block 508).

If all extracted URLs are on the list (processing box 510), processing logic returns to processing block 502 for the next set of regex if there is any (processing box 518).

If at least one of the extracted URLs is not included in the list, processing logic tags the message as potentially fraudulent (processing block 512), and waits for a further determination as to whether the mail message is in fact fraudulent.

If the analyst confirms that the message is fraudulent (processing box 514), processing logic creates a fraud filter using a hash of the fraudulent URL (processing block 516).

For example, the following regexes may be generated based on data provided by a subscriber:
^Subject: . *(eBay\paypal)
^From: .*@([-_a-z0-9]+\.)?eBay
(billing\account\password)

Next, the following exemplary messages may be screened against the above regexes:
Message 1
Subject: something about ebay
From: someone@somewhere.com
I just got an eBay account. http://www.ebay.com rocks!
Message 2
Subject: your ebay account is out of date
From: billing@ebay.com
The password for your eBay account has expired. Go to http://www.ebay-accounts.com/update.html to update it.
Message 3
Subject: ebay and paypal join forces to fight evil
From: goodguy@ebay.com
Check it out! ebay and paypal have improved their billing model!
http://www.ebay.com When the above messages are screened against the specified regexes of the subscriber, a match will be found for Messages 2 and 3 but not for Message 1.

Further, a list of valid URLs of the subscriber may be as follows:
www.ebay.com
secure.ebay.com
www.paypal.com Based on this list, Message 3 is not fraudulent, and Message 2 is likely to be fraudulent because it contains the URL "http://www.ebay-accounts.com/update.html" that is not on the list. If the analyst confirms that Message 2 is fraudulent, processing logic computes a hash value for this URL and creates a fraud filter containing the hash value.

Figure 6:
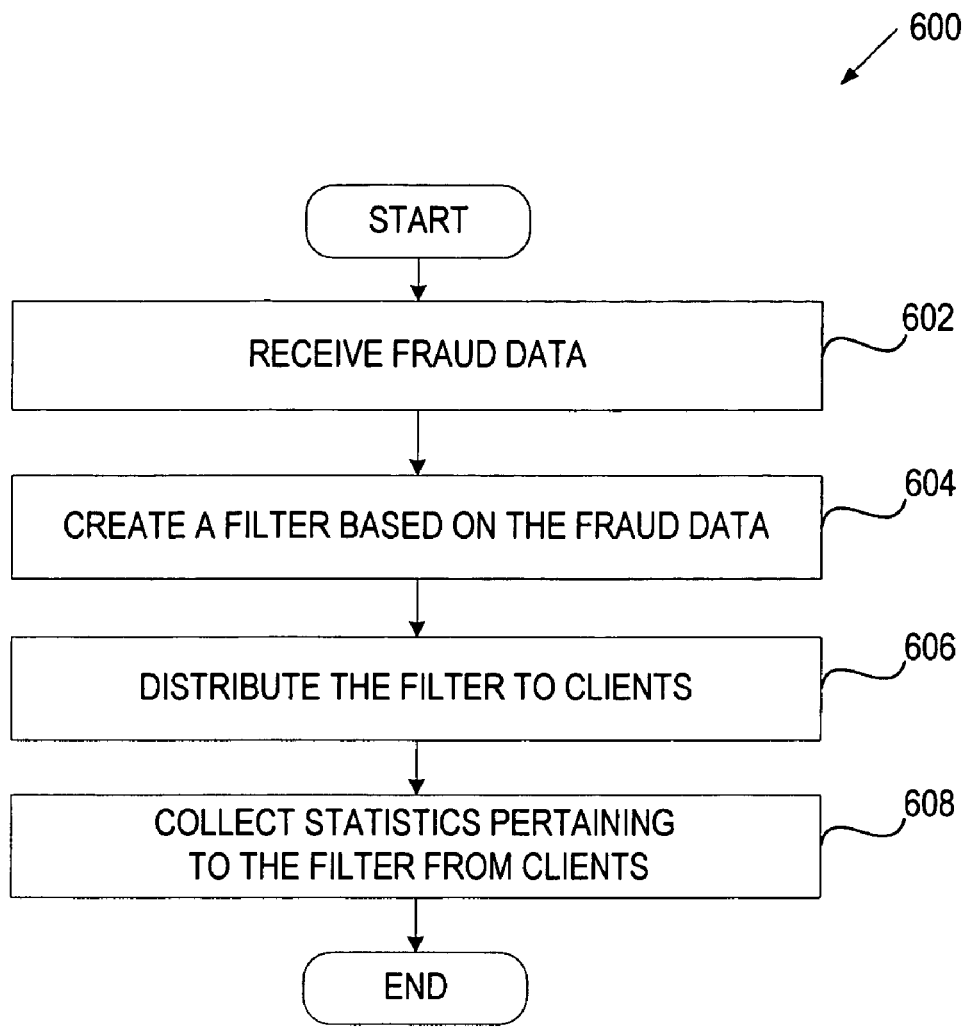
FIG. 6 is a flow diagram of one embodiment of a process for creating fraud filters.

In one embodiment, the control center 102 may receive email messages known to be fraud (e.g., fraudulent email messages filtered at the customer site), thus eliminating the need for fraud detection operations, as will be illustrated in FIG. 6.

FIG. 6 is a flow diagram of one embodiment of a process 600 for creating fraud filters. The process may be performed by processing logic that may comprise hardware (e.g., dedicated logic, programmable logic, microcode, etc.), software (such as run on a general purpose computer system or a dedicated machine), or a combination of both. In one embodiment, process 600 is performed by an anti-fraud module 108 of FIG. 1.

At processing block 602, processing logic receives fraud data. The fraud data may be a fraudulent message sent by a client or a subscriber, or subscriber-specific information identifying filtering criteria (e.g., the range of valid IP addresses, a list of valid domain names, etc.). In some embodiments, the fraud data may include one or more templates of exemplary emails that might be provided by a client or a subscriber.

At processing block 604, processing logic creates a fraud filter based on the fraud data. The fraud filter may contain a hash or any other value derived from the fraudulent message, a fraudulent URL extracted from the message, a header regex defined based on the header of the fraudulent message, or a combination of message characteristics defined based on the subscriber-specific filtering criteria.

At processing block 606, processing logic distributes the fraud filter to the clients.

At processing block 608, processing logic collects from the clients statistics pertaining to the fraud filter.

Figure 7:
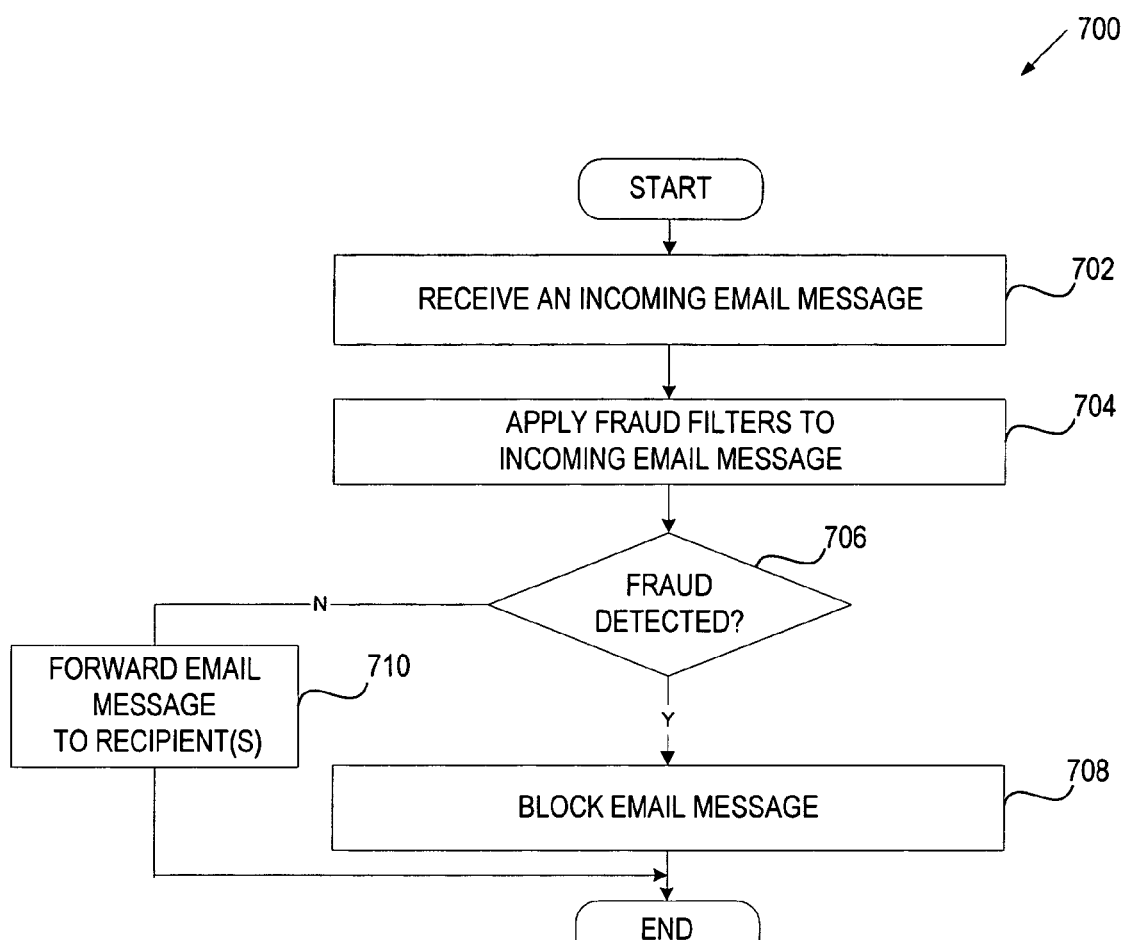
FIG. 7 is a flow diagram of one embodiment of a process for filtering fraudulent email messages.

FIG. 7 is a flow diagram of one embodiment of a process 700 for filtering fraudulent email messages. The process may be performed by processing logic that may comprise hardware (e.g., dedicated logic, programmable logic, microcode, etc.), software (such as run on a general purpose computer system or a dedicated machine), or a combination of both. In one embodiment, process 700 is performed by an email filtering module 110 of FIG. 1.

Process 700 begins with processing logic receiving an incoming email message (processing block 702). The email message may be an HTML formatted message, a plain text message, or a message of any other type.

At processing block 704, processing logic applies fraud filters to the incoming email message. In one embodiment, prior to applying the filters, processing logic determines that the reputation rating of the email sender is below threshold.

If any of the filters indicate that the email message is fraudulent (processing box 706), processing logic refrains from sending the email message to the recipient (processing block 708). In another embodiment, processing logic sends the email message to the recipient but blocks access to a web page when the recipient opens the email message and clicks on the link to this web page.

If none of the filters indicate that the email message is fraudulent, processing logic sends the email message to the recipient (processing block 710).

The system described above uses various techniques to block fraudulent mailings that affect customers (i.e., system subscribers), including creating regex and URL rules. In some embodiments, the system uses a customer-specific heuristics strategy to block fraudulent mail, where detection regexes may be tied to a specific customer. While various techniques for using customer-specific heuristics have been presented above, the system may use additional techniques described below.

Customer-Specific Heuristics

With any given customer, the system may have a fairly high chance of detecting fraudulent activities. By working with a customer directly, sophisticated heuristic rule sets can be developed to identify fraud.

In a simple example, a customer such as eBay may indicate that they
   only ever send out mail from one of 3 addresses;
   only refer to a list of domains X;
   use a certain mailer that has a certain signature.
With this information, heuristic rules can be combined—for example, as follows:
   message is not from one of the 3 ebay addresses;
   message includes non-eBay urls;
   message matches mailer signature.

Heuristic rule sets can also be generated without working directly with a customer to spot potential fraud. For instance, customer-specific regexes can be created to test against email (e.g., "this mail concerns eBay and should be examined by a human because From: =~/@([a-z0-9_-]+\.)?ebay\.com/i").

Customer Templates

The system may work directly with customers to prevent fraud proactively. Customers can provide examples of email they might send to their end-users, and the system can use these templates to sideline matching email for examination.

By working with the customer to understand their mail flow, the system may be able to prevent certain classes of fraud and to protect customers from brand spoofing.

Figure 8:
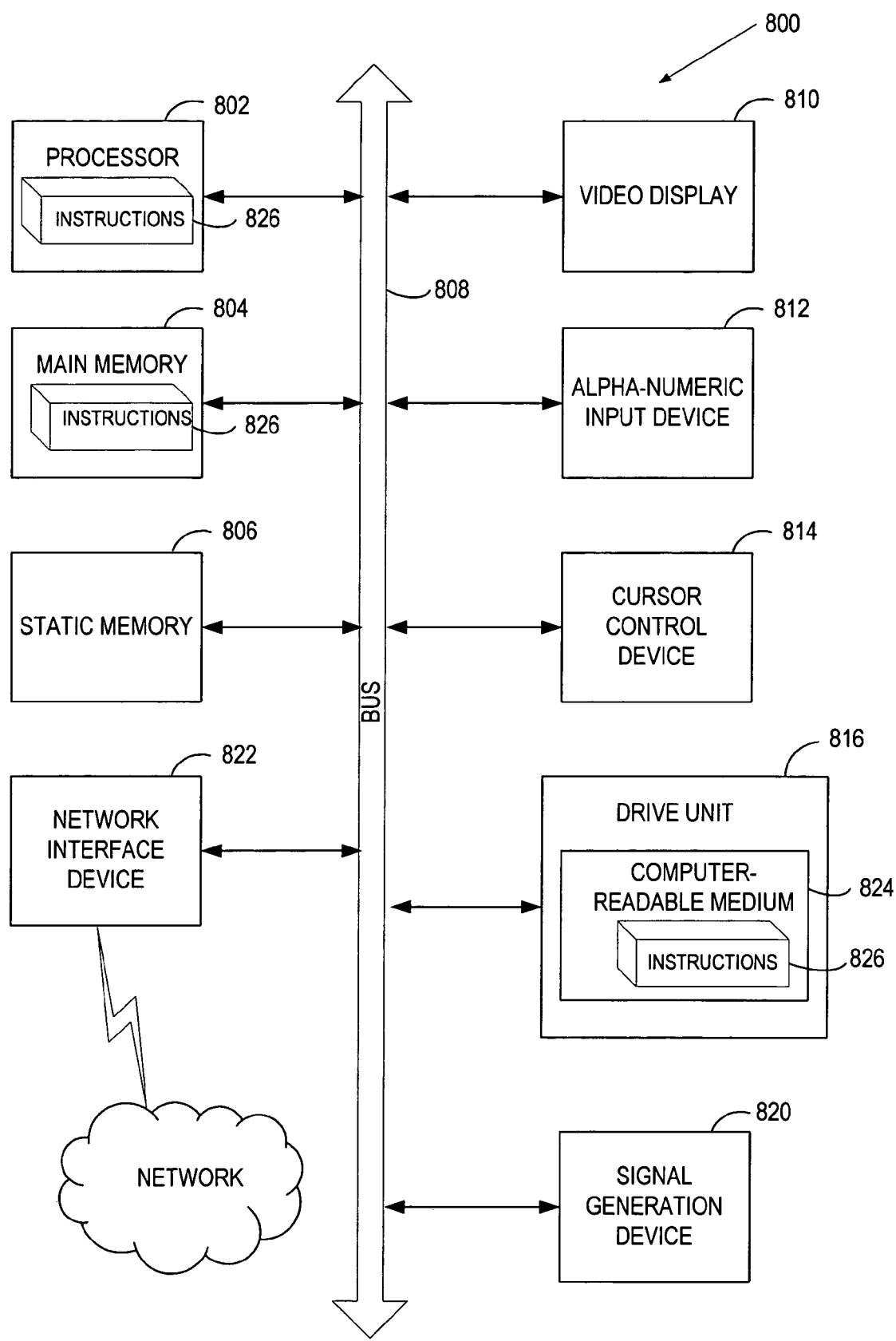
FIG. 8 is a block diagram of an exemplary computer system.

FIG. 8 is a block diagram of an exemplary computer system 800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a buss 808. The computer system 800 may further include a video display unit 810 (e.g., a liquid crystal display (LCD) or a cathode ray tube (CRT)). The computer system 800 also includes an alpha-numeric input device 812 (e.g., a keyboard), a cursor control device 814 (e.g., a mouse), a disk drive unit 816, a signal generation device 820 (e.g., a speaker) and a network interface device 822.

The disk drive unit 816 includes a computer-readable medium 824 on which is stored a set of instructions (i.e., software) 826 embodying any one, or all, of the methodologies described above. The software 826 is shown to reside, completely or at least partially, within the main memory 804 and/or within the processor 802. The software 826 may further be transmitted or received via the network interface device 822. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Although the present invention has been described in terms of certain preferred embodiments, those skilled in the art will recognize that other and further changes and modifications may be made hereto without departing from the spirit of the invention, and it is intended to claim all such changes and modifications as fall within the true scope of the invention. Accordingly, the scope of the present invention is not to be limited by the particular embodiments described, but is to be defined only by reference to the appended claims and equivalents thereof.

We claim:

1. A method, comprising:
a computer system receiving fraudulent email messages from a known email provider, wherein the fraudulent email messages misrepresent their origins as being from the email provider, and wherein the email provider is a subscriber to an anti-fraud service associated with the computer system;
the computer system receiving, from the email provider, information specifying a first set of characteristics present in valid email messages of the email provider and a second set of characteristics that are never present in valid email messages of the email provider, wherein the second set of characteristics specify that a uniform resource locator (URL) in a body of an email message has a host name that differs from a host name of the email provider; and
based on the fraudulent email messages and the first and second sets of characteristics, the computer system creating a first filter specific to the email provider, wherein the first filter is usable to determine whether a subsequently received email message is an email message that misrepresents its origin as being the email provider.

2. The method of claim 1, wherein the first set of characteristics include one or more IP addresses that are present in valid email messages of the email provider, and wherein the first filter is usable to identify a subsequently received email message purporting to be from the email provider as a phishing email message in response to the subsequently received email message not including at least one of the identified one or more IP addresses.

3. The method of claim 1, wherein the first filter is further created based on one or more general characteristics common to fraudulent email messages.

4. The method of claim 1, further comprising:
the computer system using the first filter to determine that the subsequently received email message misrepresents its origin as being the email provider.

5. The method of claim 1, further comprising:
the computer system transferring the first filter to one or more computing devices, wherein the first filter is usable by each of the one or more computing devices to determine whether subsequently received email messages are phishing email messages.

6. The method of claim 1, wherein the first set of characteristics include one or more valid domain names present in valid email messages of the email provider.

7. An apparatus comprising:
a processor;
a memory including program instructions executable by the processor to:
receive phishing email messages from an email provider, wherein the phishing email messages purport to be from the email provider, and wherein the email provider is a subscriber to an anti-fraud service associated with the system;
receive, from the email provider, information specifying a first set of characteristics of valid email messages of the email provider and a second set of characteristics that are never present in valid email messages of the email provider, wherein the second set of characteristics specify that a uniform resource locator (URL) in a body of an email message has a host name that differs from a host name of the email provider;
based on the phishing email messages and the first and second sets of characteristics, create a first filter specific to the email provider, wherein the first filter is usable to determine whether a subsequently received email message identified as being from the email provider is a phishing message.

8. A non-transitory computer-readable memory having stored thereon program instructions that, if executed by a processing system, cause said processing system to:
receive fraudulent email messages from a known email provider, wherein the fraudulent email messages misrepresent their origins as being from the email provider, and wherein the email provider is a subscriber to an anti-fraud service associated with the processing system;
receive, from the email provider, information specifying a first set of characteristics of valid email messages of the email provider and a second set of characteristics that are never present in valid email messages of the email provider, wherein the second set of characteristics specify that a uniform resource locator (URL) in a body of an email message has a host name that differs from a host name of the email provider;

based on the fraudulent email messages and the first and second sets of characteristics, create a first filter specific to the email provider, wherein the first filter is usable to determine whether a subsequently received email message identified as purporting to be from the email provider is from another email provider.

9. The apparatus of claim 7, wherein the first filter is further created based on one or more general characteristics common to phishing email messages.

10. The apparatus of claim 7, wherein the first set of characteristics include one or more uniform resource locators (URL) present in valid email messages of the email provider, and wherein the first filter is usable to identify the subsequently received email message as being a phishing message in response to the subsequently received email message including a URL that is not one of the identified one or more URLs.

11. The apparatus of claim 7, wherein the first set of characteristics include one or more IP addresses that are present in valid email messages of the email provider.

12. The apparatus of claim 7, wherein the program instructions are further executable to:

transfer the first filter to one or more computing devices, wherein the first filter is usable by each computing device to determine whether subsequently received email messages are phishing email messages.

13. The non-transitory computer-readable memory of claim 8, wherein the first set of characteristics include one or more email addresses of the email provider, and wherein the first filter is usable to determine that the subsequently received email message is from the other email provider in response to the subsequently received email message including an email address that is not one of the identified one or more email addresses.

14. The non-transitory computer-readable memory of claim 8, wherein the first set of characteristics include a signature of a mailing device of valid email messages of the email provider, and wherein the first filter is usable to determine that the subsequently received email message is from the other email provider in response to the subsequently received email message not including the signature.

15. The non-transitory computer-readable memory of claim 8, wherein the first set of characteristics include one or more domains present in valid email messages of the email provider, and wherein the first filter is configured to determine that the subsequently received email message is from the other email provider in response to the subsequently received email message including a domain that is not one of the identified one or more domains.

16. The non-transitory computer-readable memory of claim 8, wherein the program instructions are further executable by the processing system to:

transfer the first filter to one or more computing devices, wherein the first filter is usable by each computing device to determine whether subsequently received email messages are phishing email messages.

* * * * *